(12) United States Patent
Smith et al.

(10) Patent No.: US 12,496,196 B2
(45) Date of Patent: Dec. 16, 2025

(54) VERTEBRAL BODY REPLACEMENT AND INSERTION DEVICE

(71) Applicant: Alphatec Spine, Inc., Carlsbad, CA (US)

(72) Inventors: Parker Smith, San Diego, CA (US); Steven Leong, San Diego, CA (US); Jared Beach, Del Mar, CA (US); Thomas Hackathorn, Vista, CA (US); Scott Robinson, Encinitas, CA (US)

(73) Assignee: ALPHATEC SPINE, INC., Carlsbad, CA (US)

( * ) Notice: Subject to any disclaimer, the term of this patent is extended or adjusted under 35 U.S.C. 154(b) by 124 days.

(21) Appl. No.: 18/513,158

(22) Filed: Nov. 17, 2023

(65) Prior Publication Data

US 2024/0164907 A1 May 23, 2024

Related U.S. Application Data

(60) Provisional application No. 63/427,380, filed on Nov. 22, 2022.

(51) Int. Cl.
*A61F 2/44* (2006.01)
*A61F 2/30* (2006.01)
*A61F 2/46* (2006.01)

(52) U.S. Cl.
CPC ............ *A61F 2/442* (2013.01); *A61F 2/4611* (2013.01); *A61F 2002/30115* (2013.01); *A61F 2002/30133* (2013.01); *A61F 2002/30153* (2013.01); *A61F 2002/30433* (2013.01); *A61F 2002/30476* (2013.01); *A61F 2002/30523* (2013.01); *A61F 2002/3054* (2013.01);
(Continued)

(58) Field of Classification Search
CPC ....... A61F 2/442; A61F 2/44; A61F 2002/443
See application file for complete search history.

(56) References Cited

U.S. PATENT DOCUMENTS 6,752,832 B2  6/2004  Neumann
7,473,277 B2  1/2009  Boyer, II et al.
(Continued)

FOREIGN PATENT DOCUMENTS

WO       2020051005 A1    3/2020

OTHER PUBLICATIONS

International Searching Authority, "International Search Report and Written Opinion," International Application No. PCT/US2023/080365, Mar. 25, 2024.

*Primary Examiner* — Matthew J Lawson
(74) *Attorney, Agent, or Firm* — Dentons Durham Jones Pinegar; Sarah W. Matthews

(57) ABSTRACT

An expandable interbody with a modular endplate has an outer column, an inner column threadedly coupled and translatable relative to the outer column along the longitudinal axis, and an expansion ring to adjust a body length of the expandable interbody. The expansion ring has a plurality of teeth, and the outer column has at least one arm for engaging a tooth of the plurality of teeth to lock the expansion ring. The inner column and/or outer column can include a connector for connection to a modular endplate that has a substantially hollow core. The modular endplate includes a plate with a set screw entrapped therein. The modular endplate has an aperture to receive the connector of the inner and/or outer column.

19 Claims, 17 Drawing Sheets

(52) U.S. Cl.
CPC .............. *A61F 2002/30579* (2013.01); *A61F 2002/30604* (2013.01); *A61F 2002/4615* (2013.01); *A61F 2002/4627* (2013.01)

(56) References Cited

U.S. PATENT DOCUMENTS

| | | | |
|---|---|---|---|
| 7,641,693 B2 | 1/2010 | Gutlin et al. | |
| 7,674,296 B2 | 3/2010 | Rhoda et al. | |
| 7,811,327 B2 | 10/2010 | Hansell et al. | |
| 8,152,851 B2 | 4/2012 | Mueller et al. | |
| 8,568,482 B2 | 10/2013 | Kraus et al. | |
| 8,591,585 B2 | 11/2013 | Mclaughlin et al. | |
| 8,721,723 B2 | 5/2014 | Hansell et al. | |
| 9,180,018 B2 | 11/2015 | Hansell et al. | |
| 9,387,090 B2 | 7/2016 | Arnold et al. | |
| 9,393,128 B2 | 7/2016 | Hansell et al. | |
| 9,427,325 B2 | 8/2016 | Stinchfield et al. | |
| 9,687,357 B2 | 6/2017 | Bannigan et al. | |
| 10,117,753 B2 | 11/2018 | Suh et al. | |
| 10,278,834 B2 | 5/2019 | Howard et al. | |
| 10,314,717 B2 | 6/2019 | Hansell et al. | |
| 10,376,373 B2 | 8/2019 | Howard et al. | |
| 10,390,960 B2 | 8/2019 | Bannigan et al. | |
| 10,500,057 B2 | 12/2019 | Mclaughlin et al. | |
| 10,639,165 B2 | 5/2020 | Suh et al. | |
| 2010/0179655 A1 | 7/2010 | Hansell et al. | |
| 2012/0130493 A1* | 5/2012 | McLaughlin | A61F 2/44 623/17.16 |
| 2012/0209384 A1* | 8/2012 | Arnold | A61F 2/4465 623/17.15 |
| 2014/0107787 A1* | 4/2014 | Stinchfield | A61F 2/44 623/17.16 |
| 2015/0032210 A1* | 1/2015 | Stinchfield | A61F 2/44 623/17.16 |
| 2018/0243108 A1 | 8/2018 | Verbeek et al. | |
| 2018/0318107 A1 | 11/2018 | Cummins | |
| 2019/0254837 A1 | 8/2019 | Hansell et al. | |
| 2019/0269523 A1 | 9/2019 | Wallenstein et al. | |
| 2025/0000670 A1* | 1/2025 | Gupta | A61F 2/4455 |
| 2025/0127628 A1* | 4/2025 | Dusterhoft | A61F 2/442 |

* cited by examiner

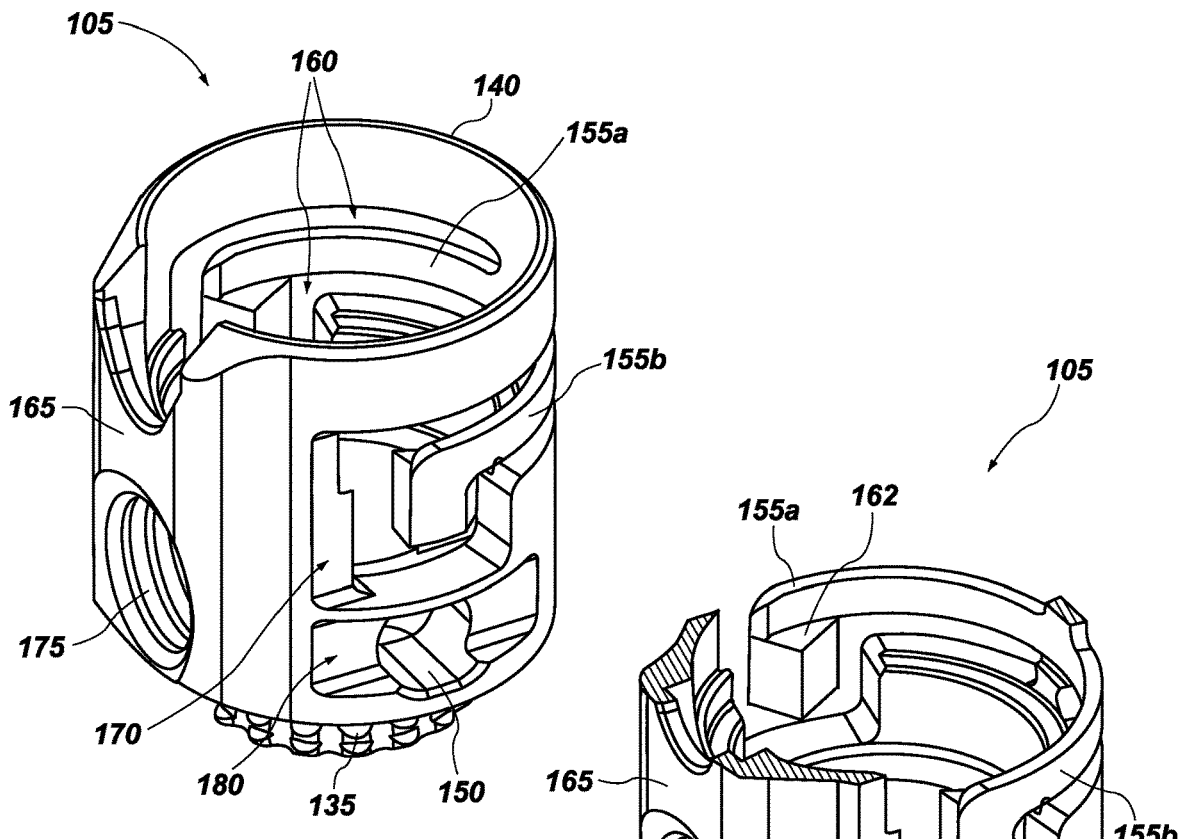
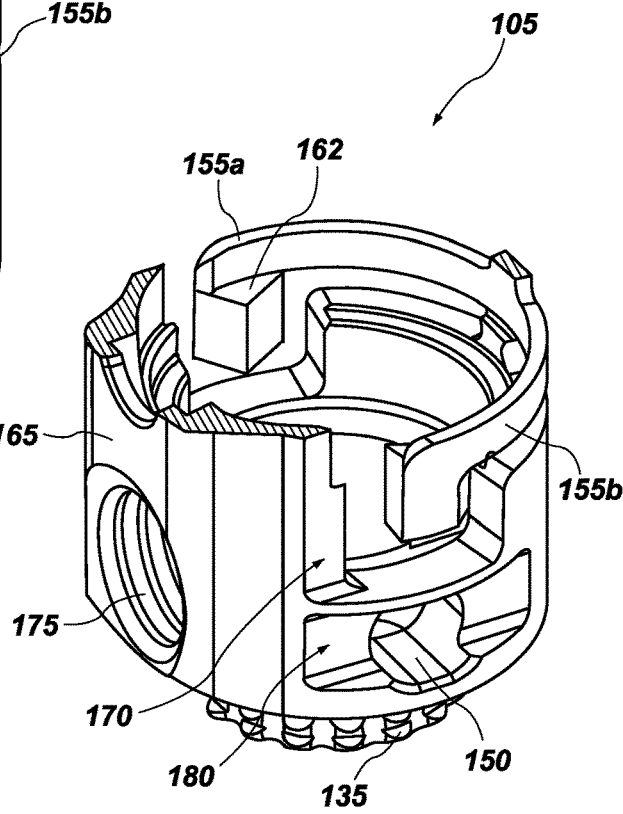
FIG. 6
FIG. 7
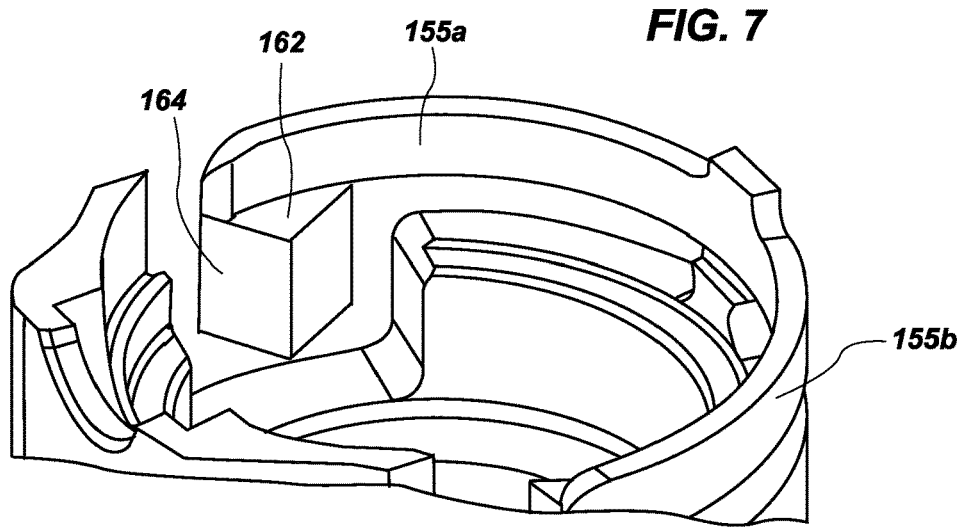
FIG. 8

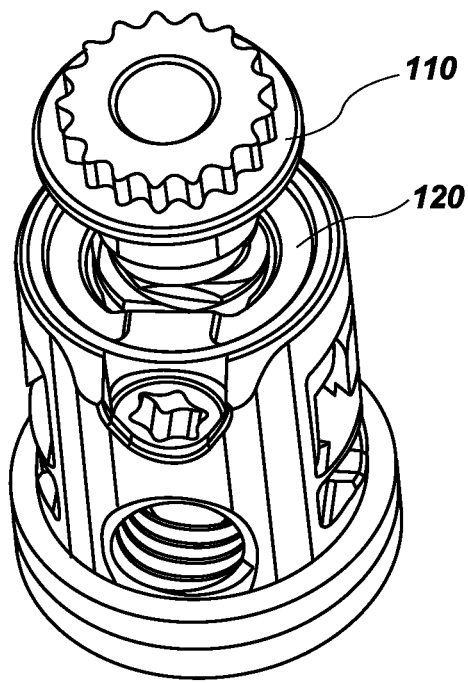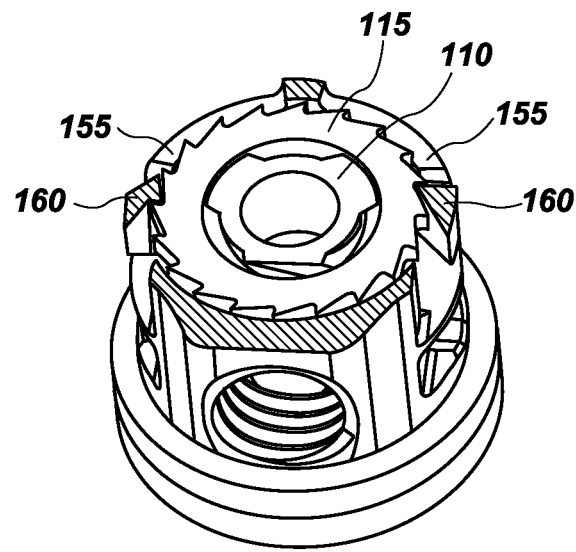
FIG. 12  FIG. 13

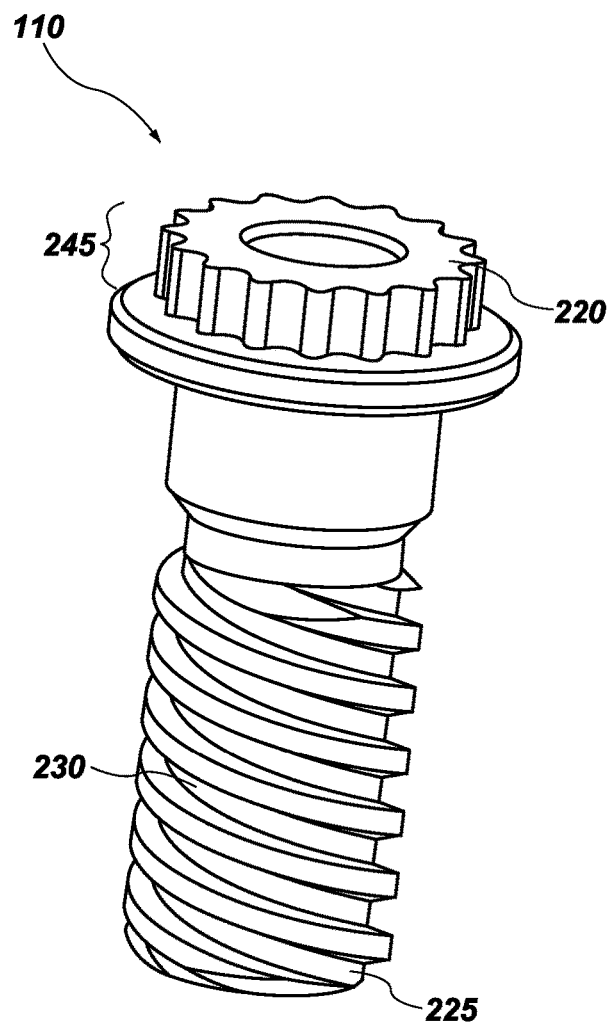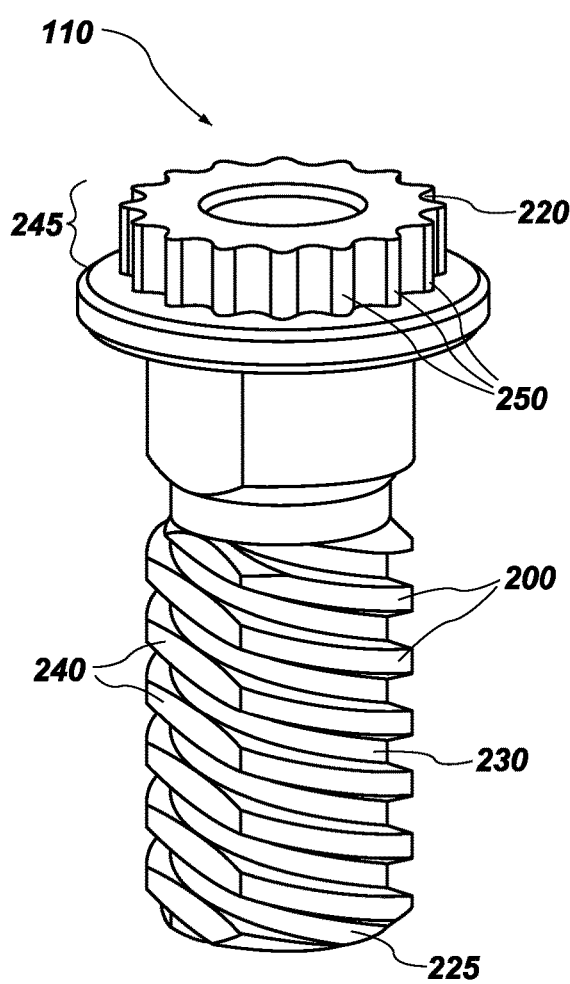
FIG. 16  FIG. 17

VERTEBRAL BODY REPLACEMENT AND INSERTION DEVICE

CROSS REFERENCE TO RELATED APPLICATION

This application claims priority under 35 U.S.C. § 119(e) to U.S. Provisional Patent Application No. 63/427,380, filed on 22 Nov. 2022 and titled SYSTEMS and VERTEBRAL BODY REPLACEMENT AND INSERTION DEVICE ("the '380 Application"). The entire disclosure of the '380 Application is hereby incorporated herein.

BACKGROUND

The present disclosure relates to spinal implants, specialized tools for spinal implant insertion, and surgical methods for replacing a portion of a vertebral body of the spine.

Fusion cages, as well as other types of interbodies and devices, are frequently utilized in spinal surgery inside a vertebra or in the disc space between respective vertebra (interbody). With interbody devices, one or more such spinal bodies are placed between vertebrae to provide support and promote fusion between adjacent vertebrae. Such fusion may be necessary because of disease, injury, general deterioration, or a congenital problem.

The goal of most spinal surgeries is to minimize the trauma of the surgery itself. One way to minimize the trauma is to create as small an access port as possible to reach the surgical site; however, a small access port then limits the size of the tools and implants that can pass through the access port.

A few interbody devices, however, are now being made that are expandable. Expandable interbodies are initially smaller than traditional non-expandable (static) interbodies such that the expandable interbodies may be more easily inserted and/or implanted into the disc space. The expandable interbodies, once positioned in the disc space, are expanded to a desirable size to achieve the amount of expansion necessary for the particular patient.

SUMMARY

The present disclosure relates to an expandable interbody that can be inserted into a disc space in a collapsed state to minimize surgical trauma to the patient and then expanded to achieve a desired lordosis. The interbody includes inner and outer columns that are vertically translatable relative to one another via an expansion ring connected to the outer column.

Rotation of the expansion ring results in the vertical expansion of the expanding body due to the outer column and inner column moving in opposite directions along their central axis.

In some embodiments, the expansion ring includes radially extending teeth that engage with locking arms of the outer column. The expansion ring cannot rotate until the locking arms of the outer column are pushed radially outwardly. In some embodiments, an insertion/expansion tool includes projections or arms that can push the locking arms of the outer column radially outwardly to allow rotation of the expansion ring.

According to another aspect, modular endplates include a substantially hollow lumen, with a set screw entrapped within a plate.

According to another aspect, methods of placing and expanding an interbody are provided.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings wherein like structure is indicated with like reference numerals and in which:

FIG. 6 is another is a top, perspective view of the outer column of the expandable interbody;

FIG. 7 is a cross-section view of the outer column shown in FIG. 6;

FIG. 8 is a perspective view of a portion of the outer column shown in FIGS. 4-7;

FIG. 12 is a top perspective view of the expandable interbody of FIGS. 10-11;

FIG. 13 is a cross-sectional view of FIG. 12;

FIG. 16 is a perspective view of an inner column of an expandable interbody;

FIG. 17 is another perspective view of an inner column of an expandable interbody of FIG. 16;

DETAILED DESCRIPTION

The present disclosure relates to expandable interbodies for use in implantation between a first and second vertebral bone. The expandable interbody is inserted into a space left by the removal of at least part of one or more vertebra, and maintains a desired spacing between the remaining vertebrae, as well as provides support, stabilization, and/or promotes bone growth between a first and second vertebral bone.

Figure 1:
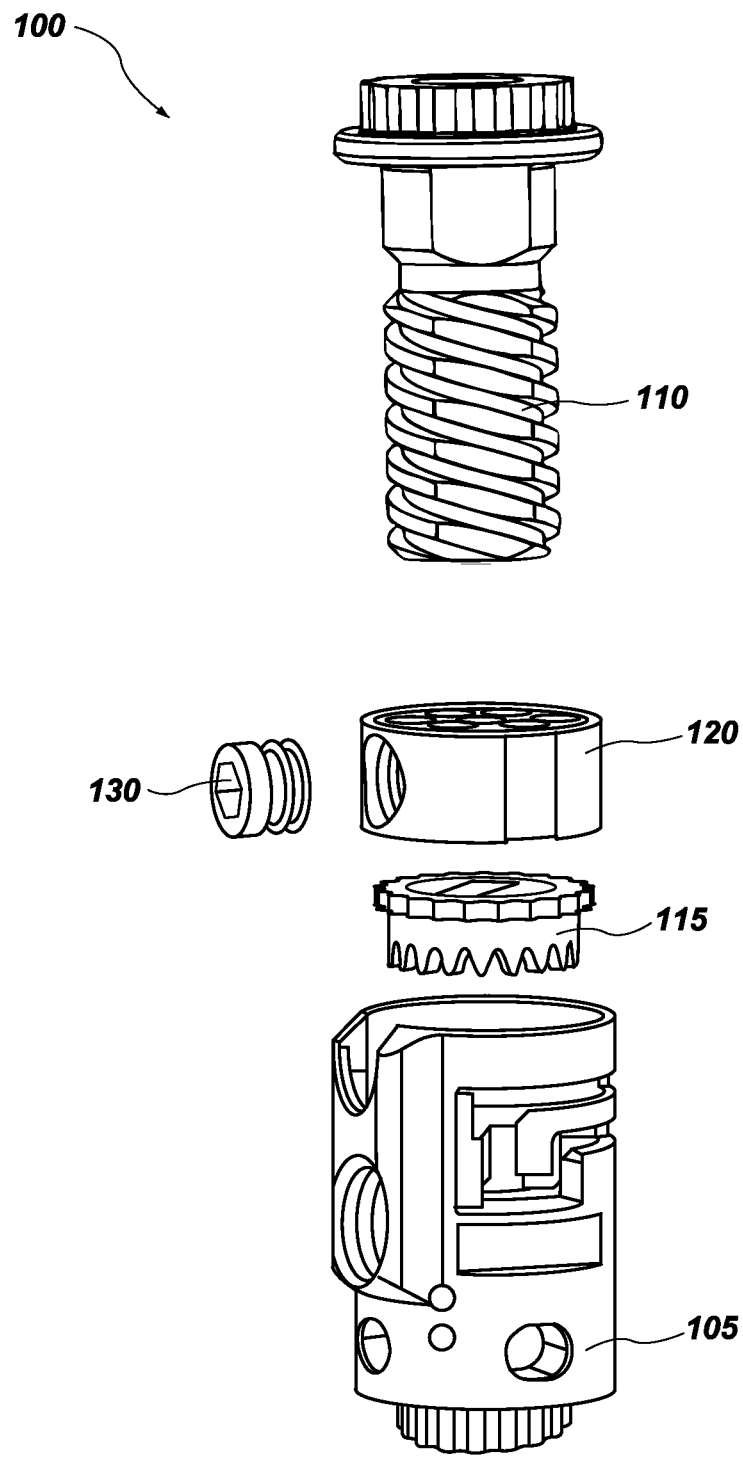
FIG. 1 is an exploded, perspective view of an expandable interbody according to the present disclosure.
Figures 2, 3:
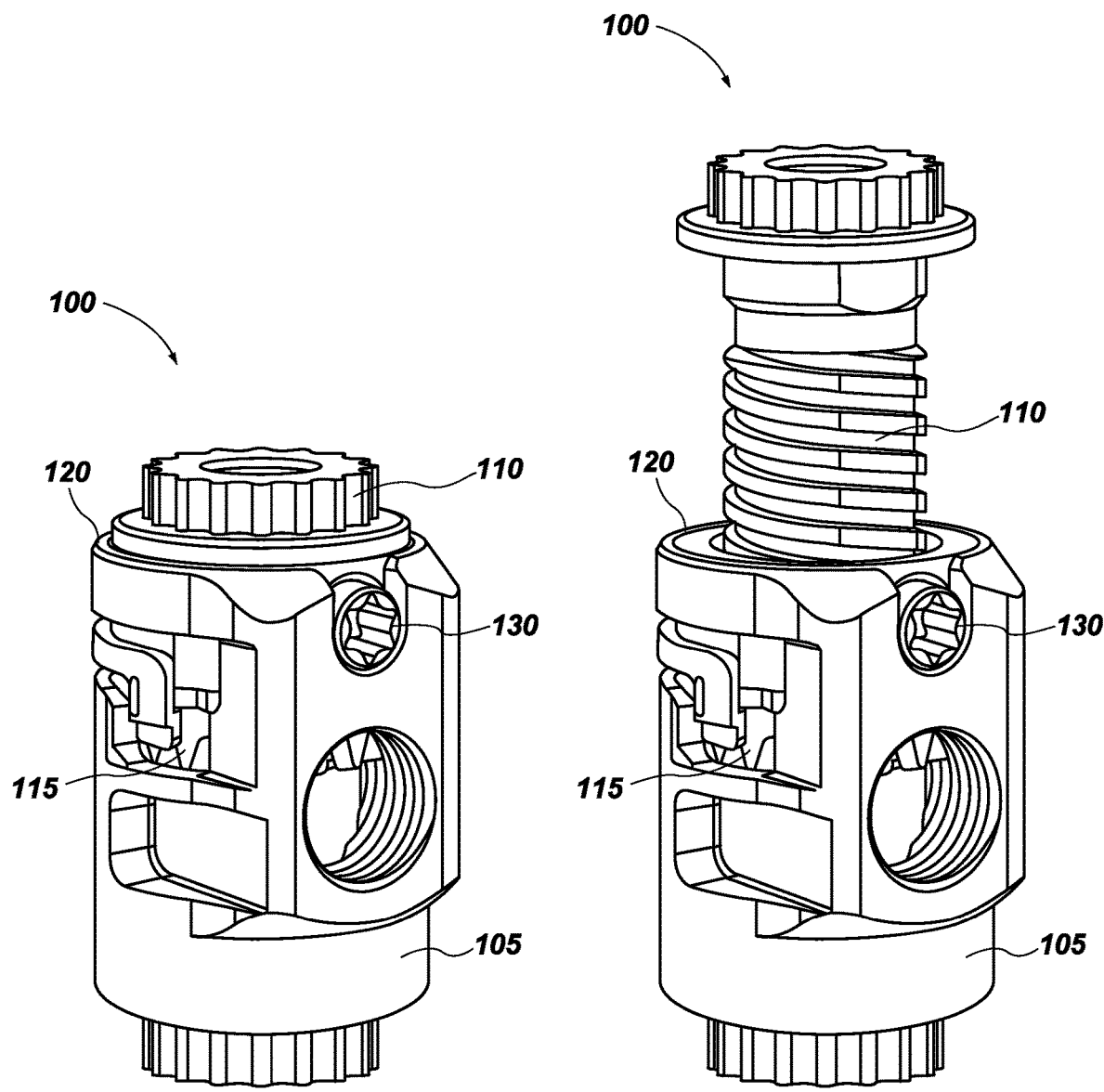
FIG. 2 is a perspective view of the embodiment shown in FIG. 1.
FIG. 3 is a perspective view of the embodiment shown in FIG. 2, with the expandable interbody in an expanded position.
Figure 4:
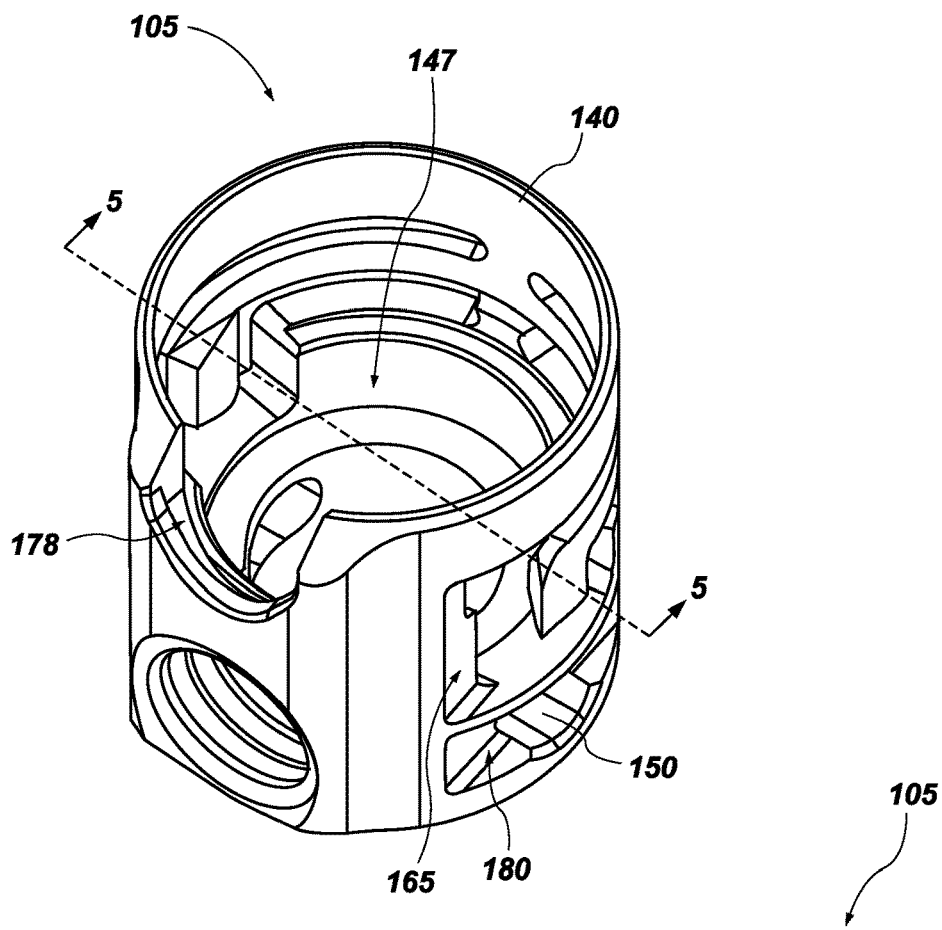
FIG. 4 is a top, perspective view of an outer column of the expandable interbody.
Figure 5:
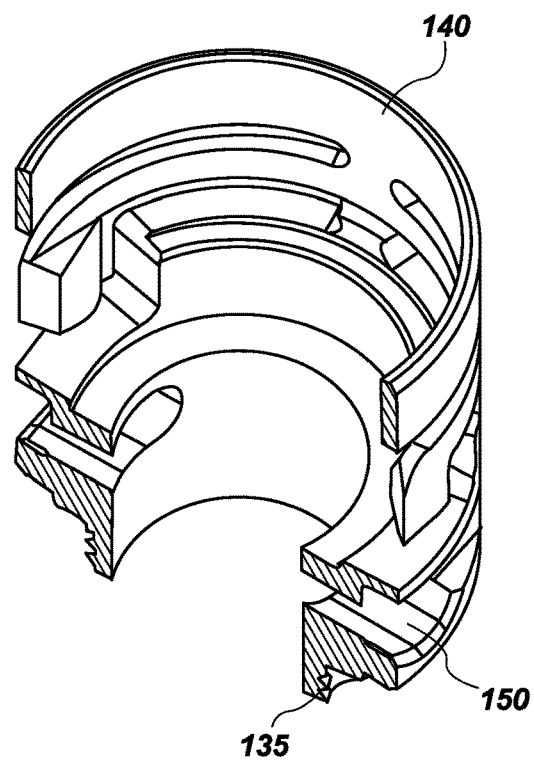
FIG. 5 is a cross-section view of the outer column shown in FIG. 4.

FIGS. 1-3 illustrate one embodiment of an expandable interbody or vertebral body replacement device 100. The exploded view of FIG. 1 shows that the expandable interbody 100 includes an outer column 105, an externally threaded inner column 110, and an expansion ring 115. The inner column 110 is threadedly coupled and moveable relative to the outer column 105 along the longitudinal axis. The expansion ring 115 may be fixed to the outer column 105 via a cap 120 to allow longitudinal adjustment of the expandable interbody. In some embodiments, a set screw 130 can be used to lock the inner and outer columns in place relative to one another.

FIG. 2 shows a perspective view of the expandable interbody 100 in an unexpanded or collapsed state, and FIG. 3 shows a perspective view of the expandable interbody 100 in an expanded or extended state. The expandable interbody 100 is configured to expand from a first end to a second end along its longitudinal axis. The expansion ring 115 is fixed at a first end of the outer column 105, and is rotatable about the longitudinal axis to adjust a location of the outer column relative to the inner column, such that rotating the expansion ring 115 results in translation of the inner column upwardly or out of the inside of the outer column 105, increasing the body length of the expandable body.

The outer column 105, inner column 110, and expansion ring 115 may each have a hollow interior portion to allow materials that induce or promote bone growth to be inserted into expandable interbody 100 and at least partially pass through expandable interbody 100 to potentially contact and interact with the bony surfaces of the superior and inferior vertebral bodies. In some embodiments, interbody 100 includes a porous material through which bone-growth-promoting materials may pass. Such porous material may also allow for bone growth into interbody 100. In some embodiments, as is discussed in greater detail below, interbody 100 can achieve in-growth of new bone instead of or in addition to achieving through-growth.

Referring to FIGS. 4-8, the outer column 105 includes a first end 135, a second end 140, with a wall 145 extending from the first end 135 to the second end 140. The wall 145 defines an interior, substantially hollow lumen 147 extending axially through outer column 105. The outer column 105 can be substantially hollow to receive an inner column 110, and/or to create space to insert materials that induce or promote bone growth. Similarly, one or more openings 150 may be provided to create space for materials that induce or promote bone growth to be inserted, and encourage new bone growth between the remaining vertebra.

The wall 145 of the outer column includes one or more arms 155 for engaging with a tooth or projection of the expansion ring 115, as detailed below. In some configurations, the outer column 105 includes one arm 155. In other configurations, the outer column 105 includes two arms 155, or more arms. In a specific configuration, the outer column 105 includes two arms 155, with a first arm 155a on a first side of the outer column 105 and a second arm 155b on a second, opposing side of the outer column 105.

In one embodiment, the arm(s) 155 of the outer column 105 are biased in a position with the arm(s) engaging the expansion ring 115. In order to disengage arm(s) 155 from the expansion ring 115, arm(s) 155 must be positioned outwardly and away from the expansion ring 115. In this embodiment, the outer column 105 to has a first, locked configuration in which the expansion ring 115 cannot move relative to the outer column and a second, unlocked configuration in which the arm(s) are expanded outwardly and the expansion ring 115 can rotate relative to the outer column 105.

Arm(s) 155 can be formed integral to the outer column 105, or they may be attached or otherwise fixed to the outer column 105. In one configuration, the first arm 155a and the second arm 155b are formed integral to the outer column 105 by slots 160 which are cut out of the wall 145 of the outer column. By cutting a slot 160 in the wall 145, the remaining portion of wall 145 that extends between the slot 160 can form an arm 155. Depending on the desired locking action of the arm(s) 155, arm(s) 155 can be any suitable length and/or width desired.

Turning to FIG. 8, a specific embodiment of an arm 155 is shown. The arm 155 includes an inwardly extending projection 162 for engaging a tooth of the plurality of radially teeth of the expansion ring. Inwardly extending projection 162 also functions as a pawl to prevent movement of the expansion ring 115 unless the pawl on the arm 155 is actively pressed out of the way.

The arm 155 and/or wall 145 of the outer column 105 may have one or more alignment features therein for interfacing with mating alignment features on an expansion and/or insertion tool. For example, the arm 155 may have front face 164 that is sloped or ramped. The front side 165 of the outer column 105 may have a similarly shaped cut-away 170, such that cut-away 170 in the front side of the outer column 105 and front, sloped face 164 of the arm 155 together form a slot. This slot, as described in more detail below, can allow an expansion tool to be inserted and to push the arm(s) 155 radially outwardly.

Similarly, the outer column 105 may have an aperture 175 to receive an expansion tool. In one configuration, the aperture 175 is through the front side 165 of the outer column 105 and may be threaded to allow the expansion tool to be threaded to the front side 165 of the outer column 105. The aperture may be sized for insertion of the expansion tool. Additional slots, such as slot 180, recesses, projections, other alignment features, etc., may be formed on the outer column 105 to interface and align with an expansion tool. A void or aperture 178 through the outer column 105 can allow a set screw to pass to frictionally fit the outer column 105 to the inner column 110.

The expansion ring 115 may be secured to the outer column 105 in any suitable manner. The expansion ring 115 can be connected to the outer column 105 at any point desired and in one embodiment, the expansion ring 115 is secured to the outer column 105 at or proximal to a second end 140 of the outer column 105.

Figure 9:
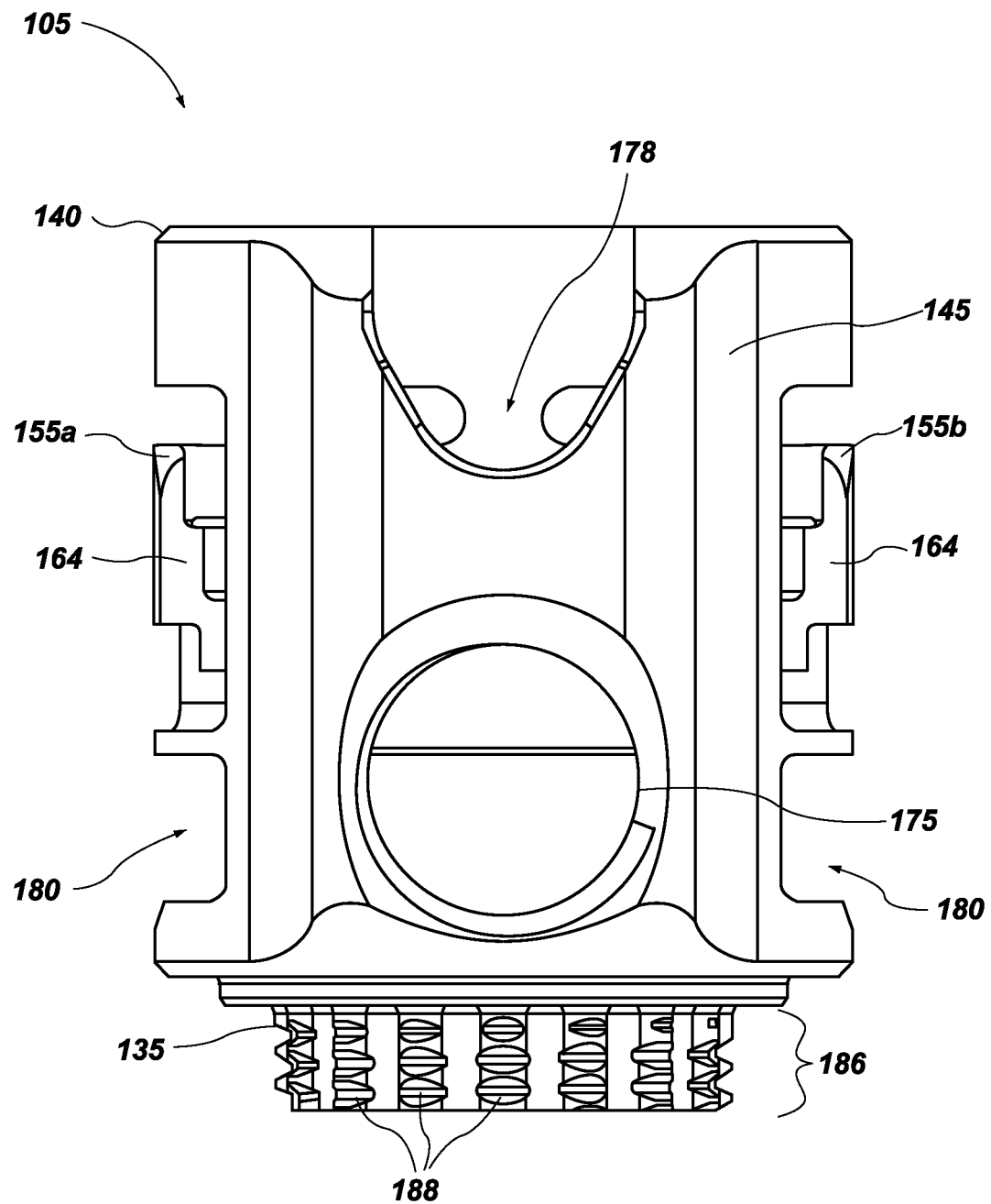
FIG. 9 is a front view of the outer column.
Figure 10:
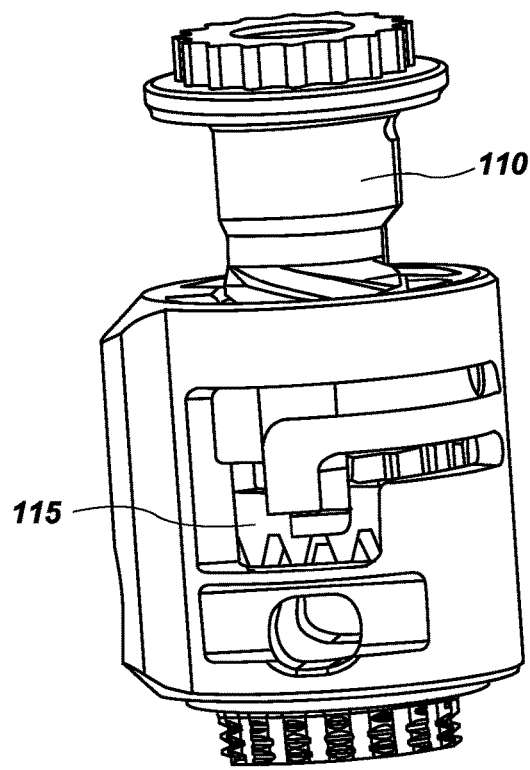
FIG. 10 is a perspective view of an expandable interbody.

Outer column 105 can also include a connector 186 (FIG. 9) for connection to an endplate on the inferior side of the interbody 100 (i.e., first end 135 of the outer column 105). The connector 186 may be any suitable connector known to attach a variety of endplates to the outer column 105. In other configurations, a connector for an endplate is not provided.

In one embodiment, the connector 186 is a threaded connector to allow a set screw for an endplate to be threaded onto the first end 135 of the outer column 105. Alternatively, the connector can include facets 188. As described in more detail below, an endplate can have an aperture that receives the sinusoidal facets 188 of the connector.

Turning now to FIGS. 10-15, an expansion ring 115 and associated cap 120 are connected to the outer column 105 to allow the expansion ring 115 to rotate about the longitudinal axis of the vertebral body replacement device or expandable interbody 100 to adjust a location of the outer column 105 relative to the inner column 110, and to adjust a body length of the expandable interbody 100. The body length is adjusted without causing the inner column 110 or outer column 105 to rotate (i.e., the inner column 110 and outer column 105 translate relative to each other).

In one embodiment, a cap 120 may secure the expansion ring 115 to the outer column 105. As mentioned above, the cap 120 can be attached to the outer column 105 in any suitable manner. Other suitable connections can also be used to secure the expansion ring 115 to the outer column 105.

Figure 11:
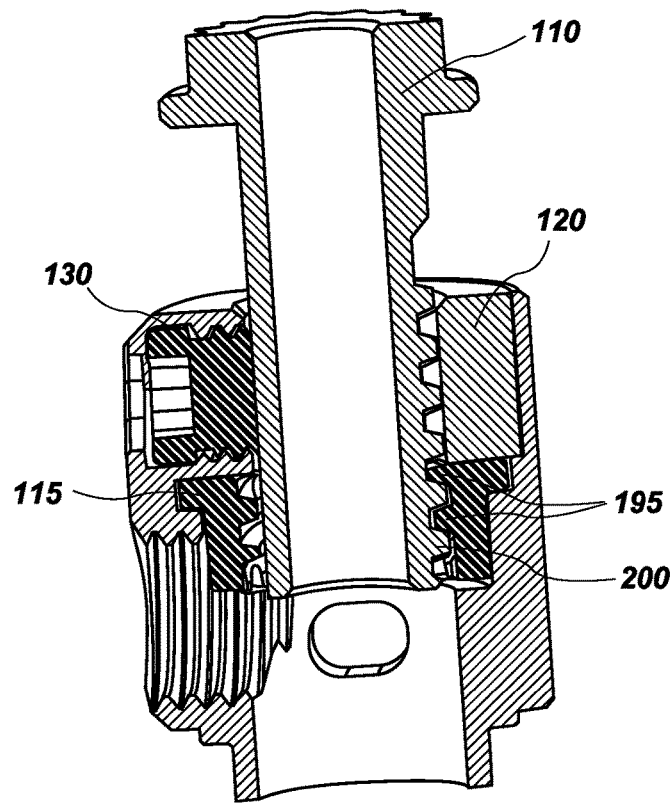
FIG. 11 is a cross-sectional view of the expandable interbody of FIG. 10.
Figure 14:
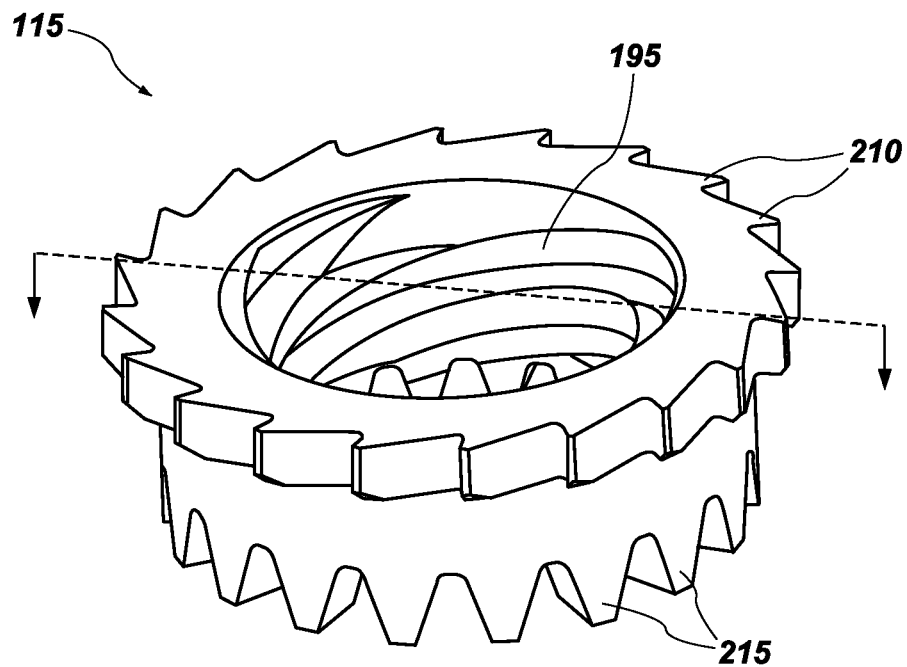
FIG. 14 is a perspective view of an expansion ring of an expandable interbody.
Figure 15:
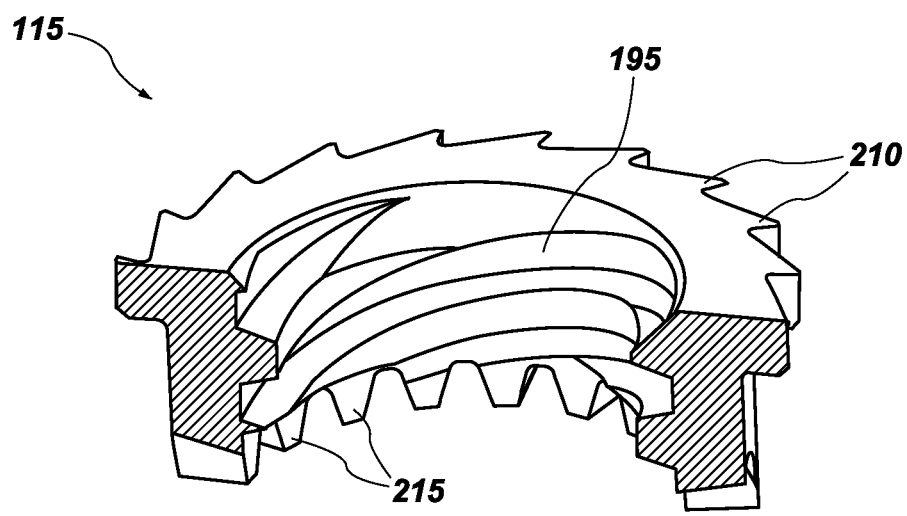
FIG. 15 is a cross-section view of FIG. 14.

The expansion ring 115 is internally threaded to mate with the internal threads on the inner column 110, as best seen in the cross-sectional view of FIG. 11. The internal threads 195 of the expansion ring 115 engage the external threads 200 of the inner column 110. As the expansion ring 115 rotates, it forces linear translation of the inner column 110 relative to the outer column 105 along its central axis.

Expansion ring 115 also includes at least one radially extending tooth 210 for engaging with the arm(s) 155 on the outer column 105. In one embodiment, the expansion ring comprises a plurality of radially extending teeth 210. Radially extending teeth 210 may form a gear that is held in place by pawl or arm(s) 155. The expansion ring 115 cannot rotate, or has limited rotation unless the arm(s) 155 are actively extended outwardly to disengage the radially extending teeth 210.

The expansion ring 115 can also include means for allowing an expansion tool to rotate the expansion ring 115. In some embodiments, the expansion ring 115 includes a plurality of longitudinally extending teeth 215 for engaging with an expansion and/or insertion tool. The tool can be inserted through an aperture (such as aperture 175) in the outer column 105 to engage with the longitudinally extending teeth as described in more detail below.

The inner column includes a first end 220 and a second end 225, with an elongated body 230 extending from the first end 220 to the second end 225. The inner column 110 generally defines a hollow interior extending axially therethrough. The hollow interior of inner column 110 enables additional bone growth promoting material to be placed within the expandable interbody 100 and also encourage new bone to form through the expandable interbody 100.

The inner column 110 includes a portion that is externally threaded and includes external threads 200 to engage the internal threads 195 of the expansion ring 115.

The inner column 110 may also have a flat or substantially flat, non-threaded portion 240 along at least a portion of the inner column 110. The flat, non-threaded portion 240 can allow a set screw 130 to lock the inner column 110 in place relative to the outer column 105. Set screw 130 can be threaded through a void or aperture 178 in the outer column 105 through to the flat, non-threaded portion 240 of the inner column 110.

Inner column 110 can also include a connector 245 for connection to an endplate on the superior side of the interbody 100 (i.e., first end 220 of the inner column 110). The connector 245 may be any suitable connector known to attach a variety of endplates to the inner column 110. In other configurations, a connector for an endplate is not provided.

In one embodiment, the connector 245 is a threaded connector to allow a set screw for an endplate to be threaded onto the first end 220 of the inner column 110. Alternatively, the connector can include sinusoidal facets 250. As described in more detail below, an endplate can have an aperture that receives the sinusoidal facets 250 of the connector 245. A threaded connector can be formed integral to the inner column 110, or in other embodiments the threaded connector can be attached to the inner column 110.

Figure 18:
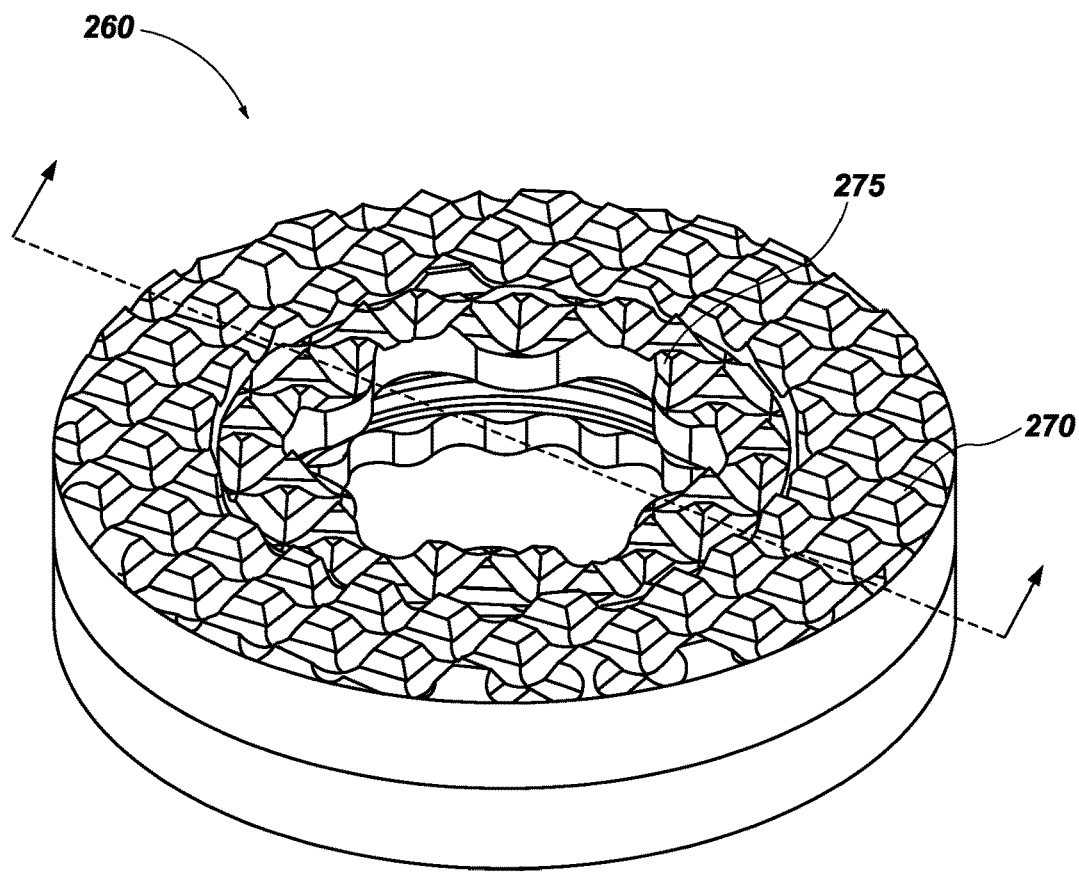
FIG. 18 is a perspective view of a modular endplate of an expandable interbody.
Figure 19:
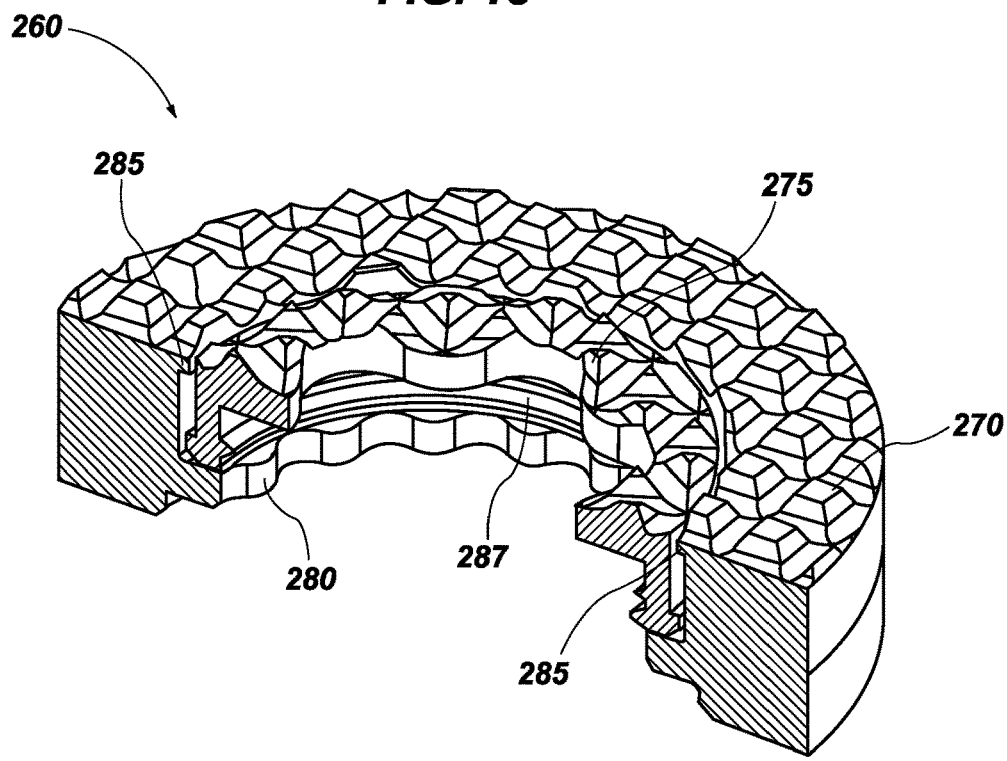
FIG. 19 is a cross-sectional view of FIG. 18.

According to another aspect of the disclosure, a method of endplate modularity and the ability to provide a graft aperture through the endplate is described. FIGS. 18-19 show an embodiment of an annular endplate 260. In some embodiments, the endplate 260 defines a central lumen 265. The central lumen 265 may allow a surgeon to pack materials that induce or promote bone growth, allow communication of bone through the endplate 260, and encourage new bone growth between the remaining vertebra. The endplate comprises a plate 270 and a set screw 275 entrapped within the plate 270 between two inwardly extending projections: an inner annular ridge 280 and an inner rim 285.

An inner annular ridge 280 includes a pattern that is mateable with the pattern provided on one or more of the outer end 135 of the outer column 105 and/or the outer end 220 of the inner column 110. In other words, the annular ridge 280 of the plate forms an aperture with an inner diameter that is shaped to receive the threaded connector of the outer end 135 of the outer column 105 and/or the outer end 220 of the inner column 110.

Figure 20:
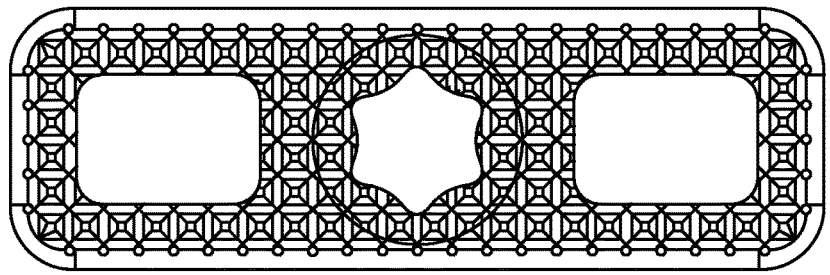
FIG. 20 is a top view of an expandable interbody with a modular endplate.
Figure 21:
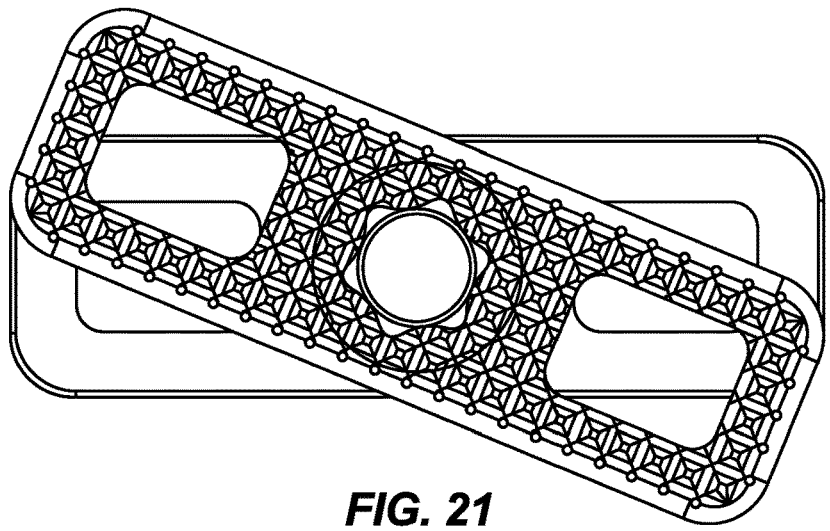
FIG. 21 is a top view of another placement configuration of the modular endplate of the expandable interbody of FIG. 20.
Figure 22:
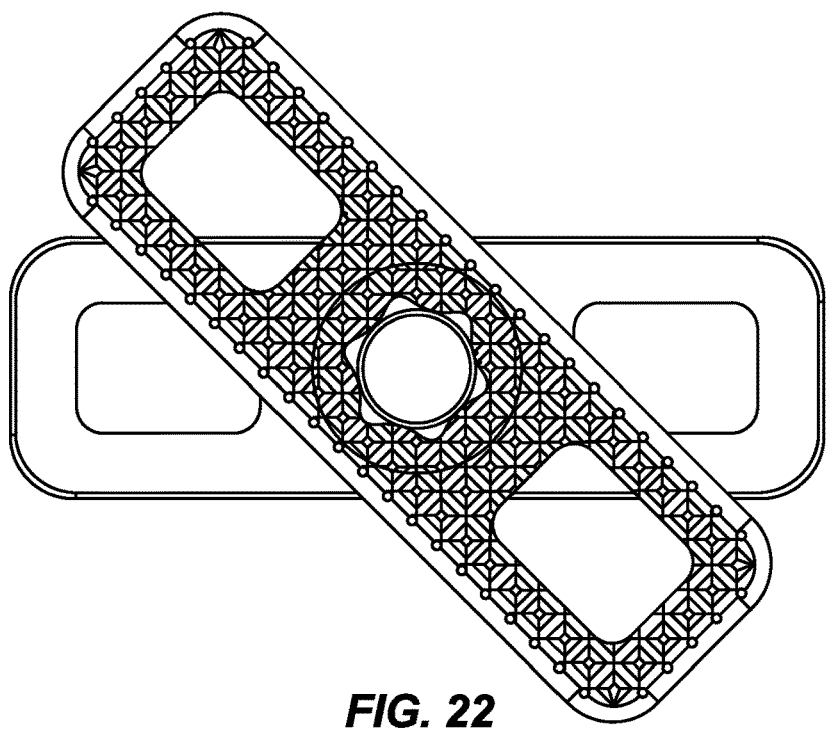
FIG. 22 is a top view of another placement configuration of the modular endplate of the expandable interbody of FIGS. 20-21.
Figure 23:
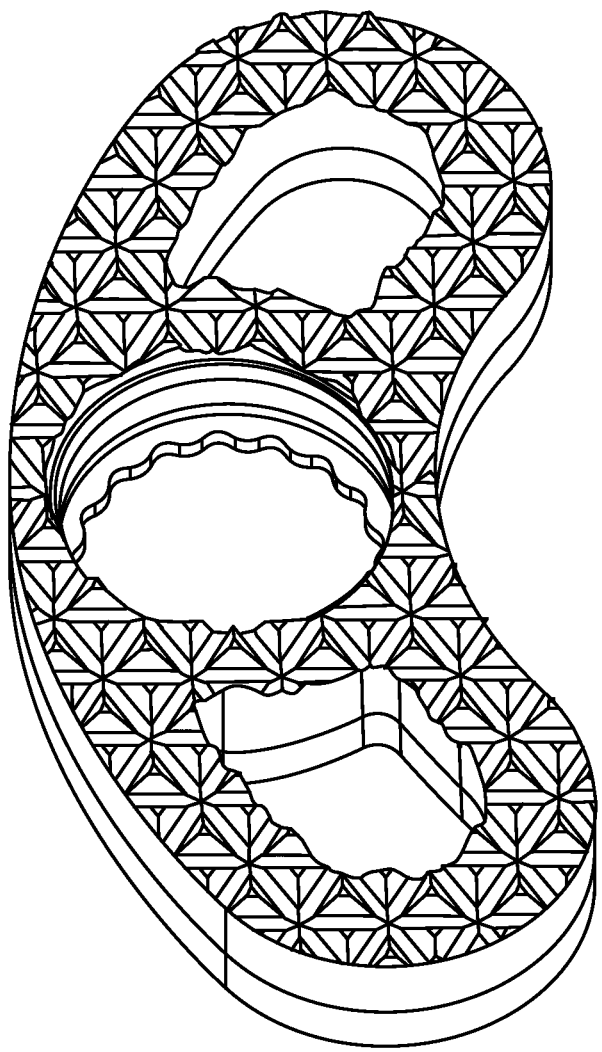
FIG. 23 is a perspective view of another modular endplate.
Figure 24:
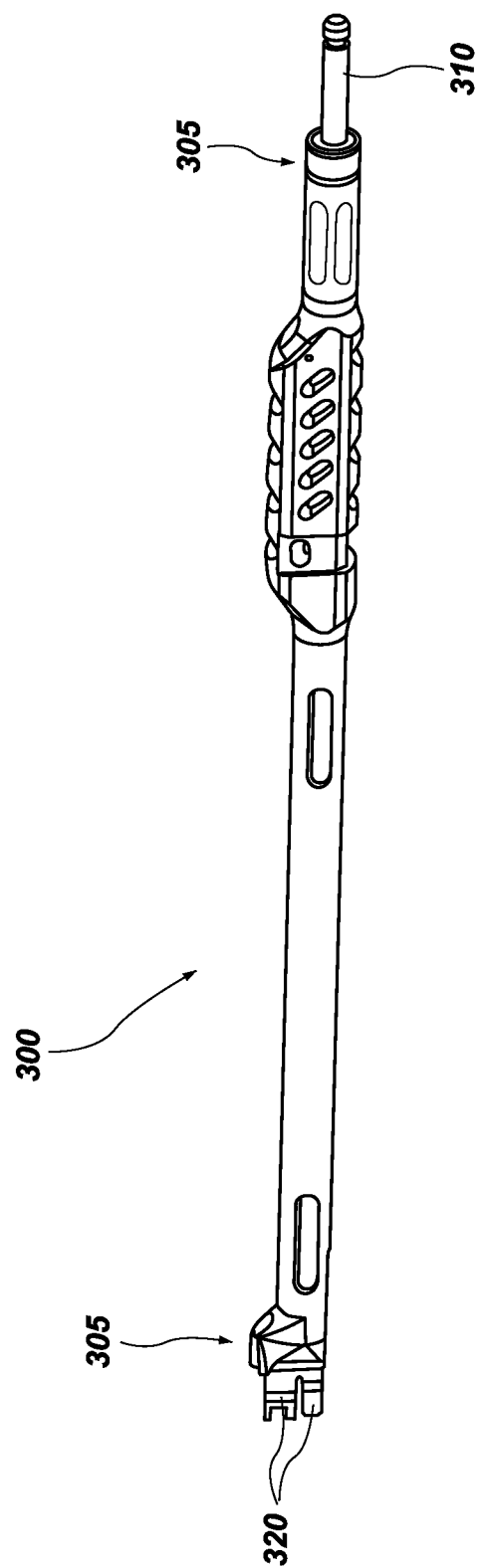
FIG. 24 is a perspective view of an insertion/expansion tool.
Figure 25:
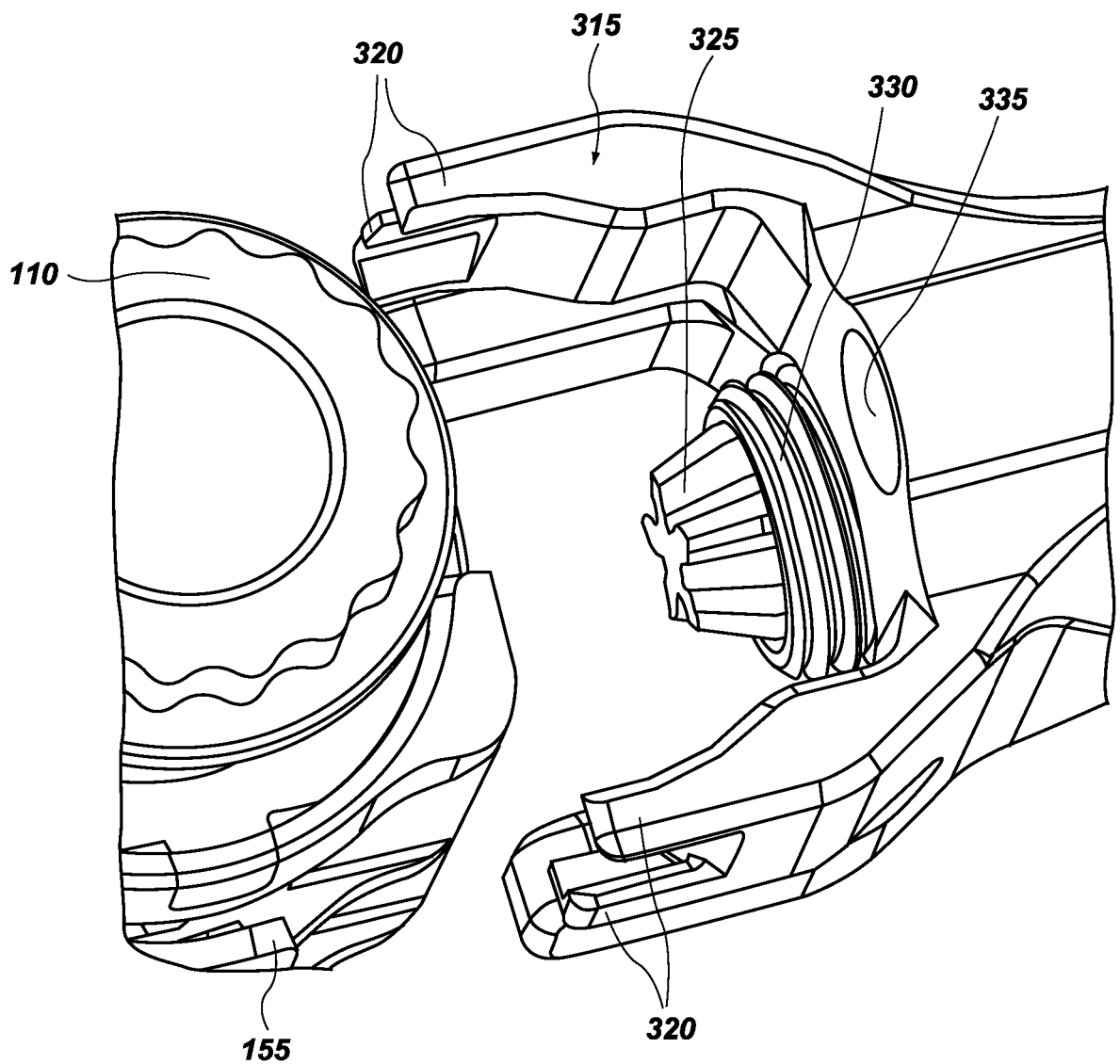
FIG. 25 is a perspective view of a distal end of an insertion/expansion tool as it approaches an expandable interbody.
Figure 26:
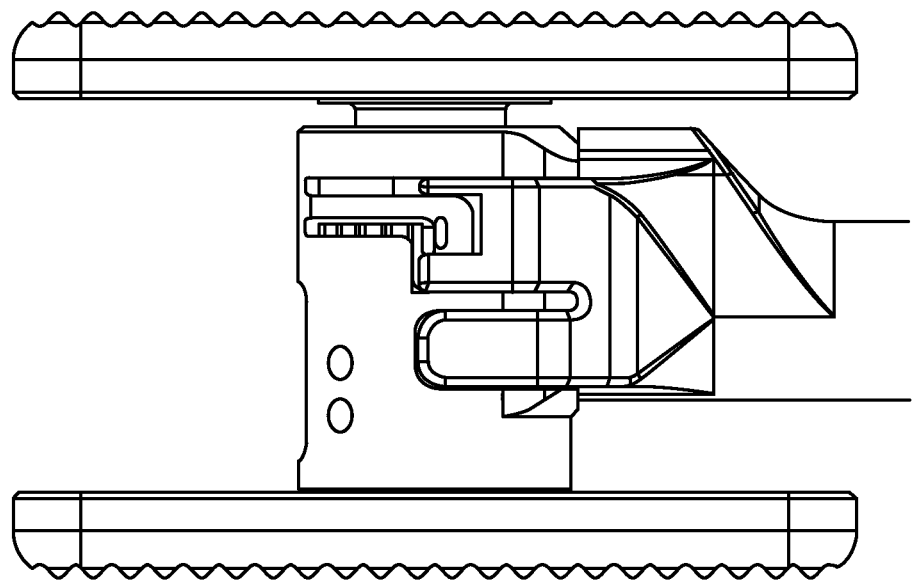
FIG. 26 is a side view of an interbody connected to an insertion/expansion tool.
Figure 27:
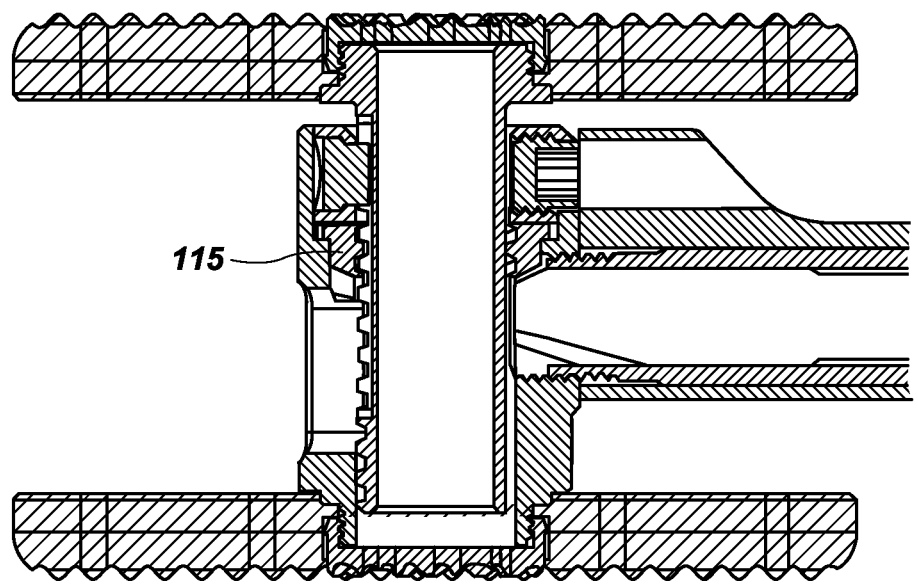
FIG. 27 is a side, cross-sectional view of the interbody connected to the insertion/expansion tool of FIG. 25, with the interbody in a retracted state.
Figure 28:
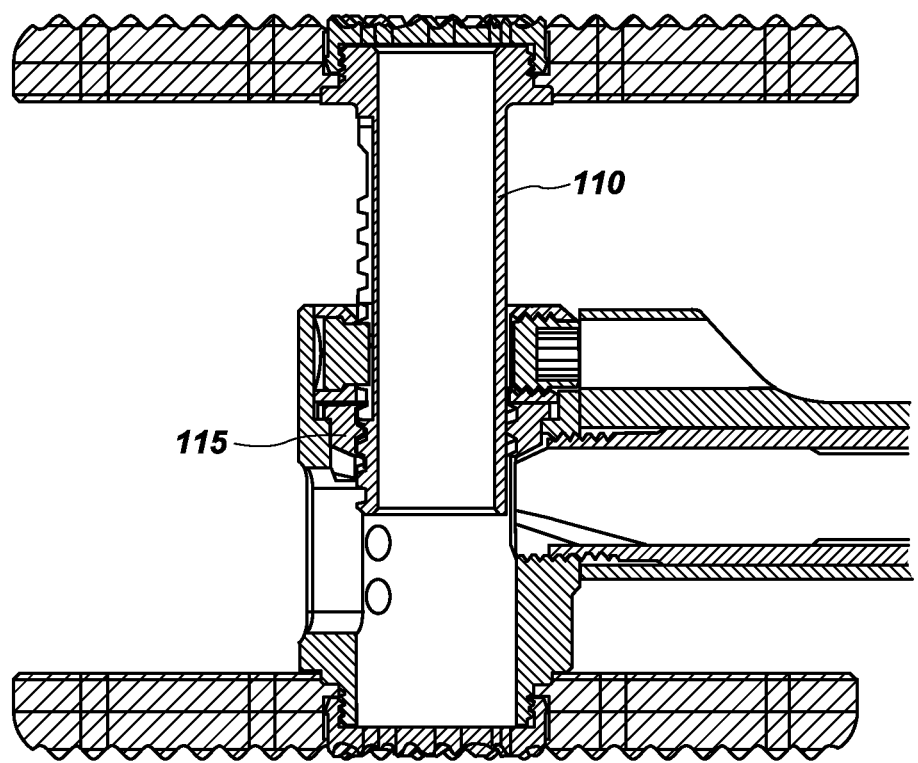
FIG. 28 is a side, cross-sectional view of the interbody connected to the insertion/expansion tool of FIG. 25, with the interbody in an expanded state.

In a specific configuration, a pattern on the inner annular ridge 280 of the plate 270 mates with a pattern on the outer column 105 and/or the inner column 110. The annular ridge 280 of the plate 270 forms an aperture with an inner diameter, and the aperture is shaped to receive the outer column 105 and/or inner column 110. Any pattern or geometry may be used. A pattern with sixteen projections or facets allows 16 different positions or geometries that the plate 270 may be placed with respect to the outer column 105 and/or the inner column 110. A pattern with fewer projections may allow fewer unique placements of the plate 270 with respect to the outer column 105 or inner column 110. FIGS. 20-22 illustrate an embodiment of an endplate with six facets, and three different relative placements of the endplate with respect to the expandable interbody 100 are shown.

After the endplate 260 is placed over the patterned portion of the inner column 110 or outer column 105, with the geometry of the inner annular ridge 280 of the endplate matching the geometry of the patterned portion of the inner column 110 or outer column 105, the set screw 275 can be turned to lock the endplate 260 into place over the end of the interbody 100. The set screw 275 includes an interior portion 287 that is mateable with the patterned portion of the inner column 110 or outer column 105. The set screw 275 also includes an outer end with a shape that is mateable with an inserter device to turn the set screw within the endplate. Having the set screw 275 entrapped within plate 270 can simplify the process for placement of the endplate 260 and ensure set screw 275 cannot become free or otherwise fall out of the plate 270.

Various geometries of endplates are contemplated. FIGS. 20-23 illustrate some embodiments of endplates. Annular, oblong, elliptical, kidney bean, polygonal, geometric, or banana-shapes are possible. Because the patterned portions on both ends of the interbody are independent, different types of endplates can be used on each end of the interbody. This also allows a surgeon to adjust lordosis on both ends of the interbody 100 to improve placement of the interbody.

Endplates can be configured to engage portions of the vertebrae in a predetermined orientation to maximize contact of the superior or external surface of the endplates with bone. Endplates can be formed with a single thickness, or with a thickness that changes, from a gradual increase in height from an anterior side to a posterior side to mimic the natural curvature of the spine. In one specific embodiment, an endplate may have a generally banana-shape and a tapered thickness, to provide a kyphotic banana endplate.

Endplates can be formed of any suitable material. In some embodiments, endplates 260 are formed of porous titanium and/or solid titanium. For example, a superior or exterior side of the endplate can be formed of porous titanium an inferior side can be formed of solid titanium according to known methods (such as those described in U.S. Patent Publication No. 2022/0087819). In other embodiments, a porosity gradient can be used.

According to another aspect, the present disclosure includes a system for use of an expandable interbody, and the system includes an insertion and/or expansion tool. In some embodiments, separate tools can be used for insertion and expansion, respectively. In other embodiments, a combination insertion/expansion tool can be used for both insertion of an expandable interbody 100 and for expansion of the expandable interbody 100.

With reference to FIGS. 24-28, insertion/expansion tool 300 has a proximal end 305 with a removable handle portion 310 and a distal end 315 for interfacing with the expandable interbody 100. Distal end 315 includes one or more arms 320 that can be inserted into the slots 170, 180 on the outer column 105. As the arms 320 of the insertion/expansion tool 300 engage the arm(s) 155 of the outer column 105, the ramped face of the arms 155 allows the arm 320 of the insertion/expansion tool to press the arms 155 radially outwardly.

The distal end 315 of the insertion/expansion tool 300 can also include a shaped driver 325, threads 330, and a guide hole 335. Threads 330 can be threaded onto the threaded aperture 175 in the front side of the outer column 105 to removably attach the distal end 315 of the insertion/expansion tool 300 to the expandable interbody 100. Driver 325 can interface with the longitudinally extending teeth 215 of the expansion ring 115 to turn the expansion ring. Guide hole 335 can be used to guide a driving mechanism to insert set screw 130.

The insertion/expansion tool may also be provided with features such as modular/interchangeable handles, additional handles to supply torque, and/or a removable end for impaction. Removable handle portion 310 allows a surgeon to apply force to the end of the tool, and have the force directly applied to the front face of the expandable interbody 100. That is, the force applied at the end of the insertion/expansion tool for impaction does not confer force on any other gears, etc., of the insertion/expansion tool.

Figure 29:
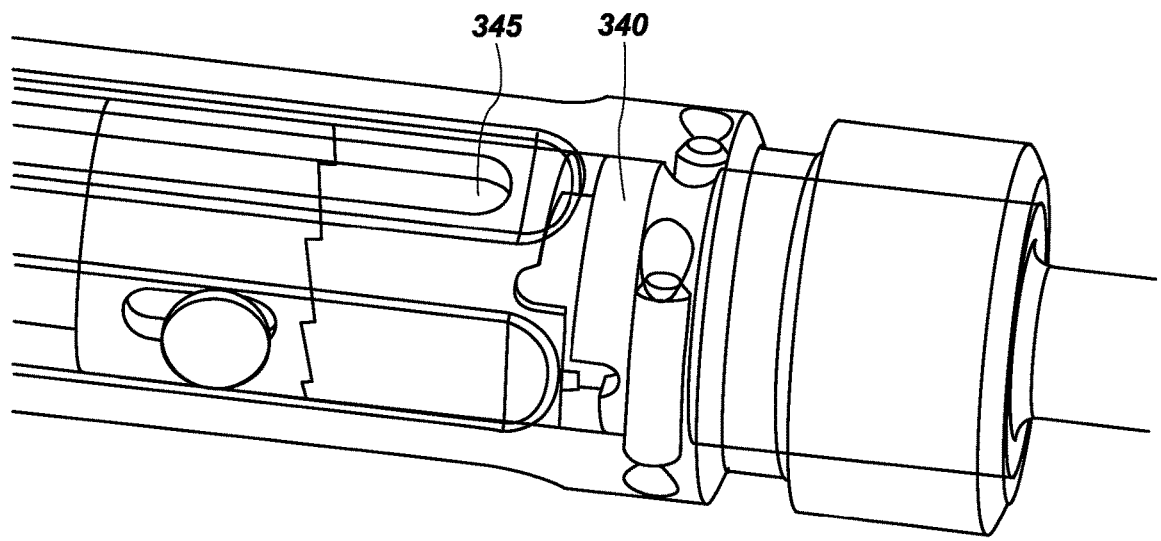
FIG. 29 is a perspective view of a proximal end of the insertion/expansion tool.
Figure 30:
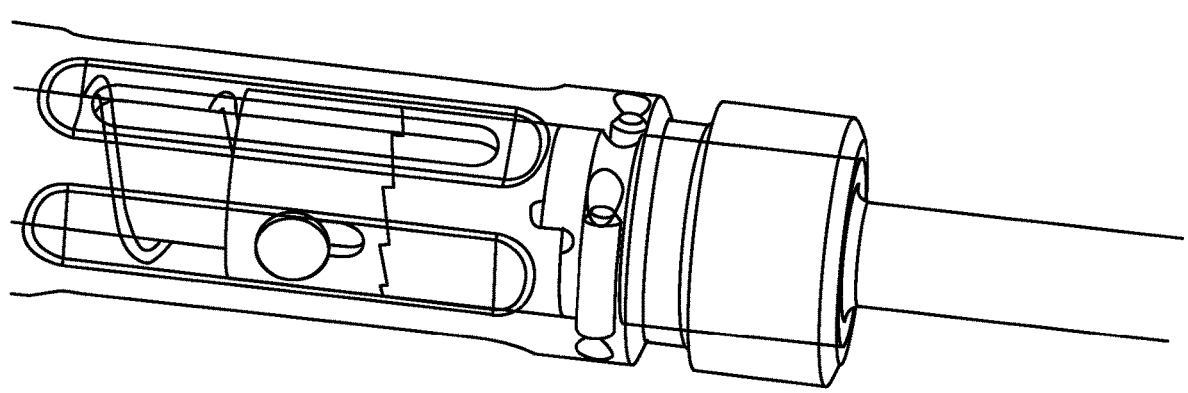
FIG. 30 is another perspective view of the proximal end of the insertion/expansion too.

In some embodiments, the insertion/expansion tool can provide a surgeon with an audible indication of expansion of the interbody 100 by the insertion/expansion tool. In one embodiment, a first, stationary ramped surface 340 is connected to the tool, with a second ramped surface 345 that rotates relative to the first ramped surface 340. The second ramped surface 345 can rotate in conjunction with the driver 325. The second ramped surface 345 can be configured to rotate with the driver (which in turn expands the expandable interbody 100) such that a specified interval of expansion of the interbody results in one full rotation of the second ramped surface 345 (i.e., 1 mm of expansion equals one rotation of the second ramped surface 345). Each time the second ramped surface 345 completes a full rotation, it slips back with respect to the first ramped surface 340 and makes an audible click. This audible clicking noise gives surgeons a clinically advantageous indication that the expandable interbody device is expanding. FIG. 29 shows the second ramped surface 345 rotating relative to the first, stationary ramped surface 340, and FIG. 30 shows the second ramped surface 345 as it slips back to make the audible clicking noise.

In use, the expandable interbody may be surgically implanted in a patient using any number of suitable methods. In some embodiments, a method of implanting expandable interbody 100 includes engaging the distal end of 305 of the insertion/expansion tool 300 onto the front side of the outer column 105. With inserter insertion/expansion tool 300 engaged with interbody 100, interbody 100 is positioned in the intervertebral disc space and positioned as desired. Positioning interbody 100 in a desired location can be achieved using fluoroscopy. To this end, one or more of the components of interbody 100 can be at least partially radiopaque. In some embodiments, interbody 100 includes one or more radiopaque markers whose primary purpose is to aid in proper positioning of interbody 100 in the intervertebral disc space. In some embodiments, the insertion/expansion tool is not engaged with expandable interbody 100 until expandable interbody 100 has been properly positioned in the intervertebral disc space. In embodiments where interbody 100 is connected to the insertion/expansion tool 300 prior to insertion, the proximal end 305 of the insertion/expansion tool 300 can be constructed to receive and withstand hammer blows that may be required to properly position expandable interbody 100.

With interbody 100 properly positioned, the insertion/expansion tool is rotated to cause expansion ring 115 to rotate, causing translation of the outer column 105 and inner column 110 relative to each other. Expandable interbody 100 is expanded by continuing to rotate the insertion/expansion tool 300 until a desired amount of expansion is achieved. The amount of expansion can be observed using an expansion indicator or by using fluoroscopy.

Once the desired amount of expansion is achieved, the insertion/expansion tool 300 is removed from the expandable interbody 100. As soon as the insertion/expansion tool 300 is removed, the arms 155 of the outer column 105 resume their biased position and engage radially extending teeth of the expansion ring 115, locking expansion ring 115 in place. The outer column 105 and inner column 110 can be further locked into place by use of a set screw 130. In some embodiments, biologics or materials that promote bone growth are then injected into interbody 100 by injecting them through the cannulated structure of the insertion/expansion tool 300.

It will be appreciate that the expandable interbody 100 can be used for spinal surgeries on any portion of the spine, including the cervical, thoracic, and/or lumbar spine. To accommodate various parts of the spine, the expandable interbody 100 can be formed in different sizes. FIGS. 1-3, for example, show an embodiment of a cervical device. FIGS. 20-22 show an embodiment of a thoraco-lumbar device.

EMBODIMENTS

The following embodiments are provided as examples only of specific configurations, materials, arrangements, etc. contemplated by the authors of this disclosure:

Embodiment 1. A vertebral body replacement device dimensioned for implantation between a first and second vertebral bone, comprising:
- an expandable body configured to expand from a first end to a second end along a longitudinal axis, the expandable body having an outer column, an inner column threadedly coupled and translatable relative to the outer column along the longitudinal axis, and an expansion ring;
- wherein the expansion ring is rotatable about the longitudinal axis to translate the outer column relative to the inner column to adjust a body length of the expandable body, the expansion ring comprising a plurality of radially extending teeth for engaging with an arm of the outer column and a plurality of teeth for engaging with an inserter device;
- the outer column comprising the arm for engaging a tooth of the plurality of radially extending teeth of the expansion ring;
- wherein the arm of the outer column has a first, locked configuration in which the expansion ring cannot move relative to the outer column and a second, unlocked configuration in which the arm is expanded outwardly to disengage the tooth of the plurality of radially extending teeth to allow the expansion ring to rotate relative to the outer column.

Embodiment 2. The vertebral body replacement device of embodiment 1, wherein the outer column comprises a first arm for engaging a first tooth of the plurality of radially extending teeth of the expansion ring, and wherein the outer column further comprises a second arm for engaging a second tooth of the plurality of radially extending teeth of the expansion ring.

Embodiment 3. The vertebral body replacement device of embodiment 2, wherein the second arm is on an opposite side of the outer column from the first arm.

Embodiment 4. The vertebral body replacement device of embodiment 3, wherein the first and second arm are configured to be mirror images of each other.

Embodiment 5. The vertebral body replacement device of any one of embodiments 1-4, wherein the outer column comprises a first end and a second end, with a wall of the outer column extending from the first end to the second end.

Embodiment 6. The vertebral body replacement device of any one of embodiments 2-5, wherein the first arm and second arm are formed integral to the outer column by slots cut out of the wall of the outer column.

Embodiment 7. The vertebral body replacement device of any one of embodiments 2-6, wherein the first arm and the second arm comprise an inwardly facing sloped face.

Embodiment 8. The vertebral body replacement device of any one of embodiments 2-7, wherein the first arm and the second arm comprise an inwardly extending projection for engaging a tooth of the plurality of radially extending teeth of the expansion ring.

Embodiment 9. The vertebral body replacement device of any one of embodiments 2-7, wherein the expandable body comprises a first endplate at the first end and a second endplate at the second end.

Embodiment 10. The vertebral body replacement device of embodiment 9, wherein the first and second endplates independently have one of the following shapes: square, circular, rectangular, oval, and kidney-bean shaped.

Embodiment 11. The vertebral body replacement device of any one of embodiment 9 and 10, wherein the at least one endplate is modular and connectable to the first or second end.

Embodiment 12. The vertebral body replacement device of embodiment 11, wherein the at least one endplate is configured to connect the first or second end at two or more angles relative to the vertebral body replacement device.

Embodiment 13. The vertebral body replacement device of any one of embodiments 9 and 10, wherein at least one of the first and second endplates is integral to the inner or outer column, respectively.

Embodiment 14. The vertebral body replacement device of any one of embodiments 1-8, wherein the first end of the inner column comprises a connector for attachment to an endplate, the connector comprising facets; and
- an endplate comprising a set screw and a plate, the set screw entrapped within the plate between an inner annular ridge and an inner rim; and
- wherein the endplate is connectable to the inner column.

Embodiment 15. The vertebral body replacement device of embodiment 14, wherein the facets are sinusoidal.

Embodiment 16. The vertebral body replacement device of any one of embodiment 14 and 15, wherein the inner annular ridge of the plate forms an aperture with an inner diameter pattern, the aperture to receive the facets of the connector of the outer column, and wherein the inner diameter pattern of the set screw is connectable to the facets of the connector of the outer column.

Embodiment 17. The vertebral body replacement device of any one of embodiments 1-16, wherein the first end of the inner column comprises a connector for attachment to a set screw of an endplate, the connector comprising facets; and
- an endplate comprising a set screw and a plate, the set screw entrapped within the plate between an inner annular ridge and an inner rim and the set screw having an internal pattern; and
- wherein the endplate is connectable to the inner column.

Embodiment 18. The vertebral body replacement device of embodiment 16, wherein the inner annular ridge of the plate forms an aperture with an inner pattern, the aperture to receive the facets of the connector of the outer column, and wherein the inner pattern of the set screw is configured to engage with the facets of the connector of the outer column.

Embodiment 19. An expandable interbody comprising:
- an expandable body configured to expand from a first end to a second end along a longitudinal axis, the expandable body having an outer column, an inner column threadedly coupled and moveable relative to the outer column along the longitudinal axis, and an expansion ring;
- wherein the expansion ring is rotatable about the longitudinal axis to adjust a relative location of the outer column to the inner column to adjust a body length of the expandable body, the expansion ring comprising a passive lock; and
- the outer column comprising an arm for engaging the passive lock of the expansion ring.

Embodiment 20. A vertebral body replacement system comprising:
an expandable body configured to expand from a first end to a second end along a longitudinal axis, the expandable body having an outer column, an inner column threadedly coupled and translatable relative to the outer column along the longitudinal axis, and an expansion ring;
wherein the expansion ring is rotatable about the longitudinal axis to translate the outer column relative to the inner column to adjust a body length of the expandable body;
the outer column comprising a first end and a second end, and wherein the first end comprises a connector for attachment to a set screw of an endplate; and
an endplate comprising a set screw and a plate, the set screw entrapped within the plate between an inner annular ridge and an inner rim; and
wherein the endplate is connectable to the outer column.

Embodiment 21. A vertebral body replacement system comprising:
an expandable body configured to expand from a first end to a second end along a longitudinal axis, the expandable body having an outer column, an inner column threadedly coupled and translatable relative to the outer column along the longitudinal axis, and an expansion ring;
wherein the expansion ring is rotatable about the longitudinal axis to translate the outer column relative to the inner column to adjust a body length of the expandable body;
the inner column comprising a first end and a second end, and wherein the first end comprises a connector for attachment to a set screw of an endplate; and
an endplate comprising a set screw and a plate, the set screw entrapped within the plate between an inner annular ridge and an inner rim; and
wherein the endplate is connectable to the inner column.

Embodiment 22. The vertebral body replacement system of embodiment 20 or embodiment 21, wherein the inner annular ridge of the plate forms an aperture with an inner diameter, the aperture to receive the facets of the connector of the outer column, and wherein the set screw is configured to engage with the connector of the outer column.

Embodiment 23. The vertebral body replacement system of any one of embodiments 20-22, further comprising a passive locking mechanism.

Embodiment 24. The vertebral body replacement system of embodiment 23, wherein the passive locking mechanism comprises the expansion ring comprising a plurality of radially extending teeth for engaging with an arm of the outer column and a plurality of teeth for engaging with an inserter device;
the outer column comprising the arm for engaging a tooth of the plurality of radially extending teeth of the expansion ring;
wherein the arm of the outer column has a first, locked configuration in which the expansion ring cannot move relative to the outer column and a second, unlocked configuration in which the arm is expanded outwardly to disengage from the plurality of radially extending teeth to allow the expansion ring to rotate relative to the outer column.

Embodiment 25. The vertebral body replacement device of any one of embodiments 1-18, the expandable interbody of embodiment 19, or the vertebral body replacement system of any one of embodiments 20-24, wherein the outer column further comprises an aperture configured to provide access to the inserter-engaging teeth of the expansion ring.

Embodiment 26. The vertebral body replacement device, expandable interbody, or vertebral body replacement system of embodiment 25, wherein the aperture comprises a threaded surface.

Embodiment 27. An inserter comprising:
an elongate portion having a proximal end and a distal end, the elongate portion defining an axis and having a lumen open at the proximal and distal ends;
a handle located at the proximal end of the elongate portion, the handle configured to be rotatable relative to the elongate portion;
an engagement portion located at the distal end of the elongate portion;
an expansion driver positioned within the lumen having an operable end that extends at least partially from the distal end of the elongate portion, the expansion driver configured to be mechanical connectable to the handle;
wherein the engagement portion comprises:
a first pair of extensions extending distally along the axis of the elongate portion, the first pair of extensions configured to disengage a passive locking mechanism when the inserter is connected to an expandable interbody Embodiment 28. The inserter of embodiment 27, further comprising an engagement driver positioned within the lumen having an operable end that extends at least partially from the distal end of the elongate portion, the engagement driver configured to be mechanically connectable to the handle.

Embodiment 29. The inserter of embodiment 28, wherein the engagement driver comprises a lumen within which is positioned the expansion driver.

Embodiment 30. The inserter of any one of embodiments 27-29, wherein the operable end of the expansion driver comprises a plurality of radial extensions configured to engage with teeth of an expansion ring of an expandable interbody.

Embodiment 31. The inserter of any one of embodiments 28-30, wherein the operable end of the engagement driver comprises a threaded surfaces configured to threadingly engage with a threaded aperture of an expandable interbody Embodiment 33. The inserter of any one of embodiments 27-32, further comprising a driver guide positioned at or near the distal end of the elongate portion, the driver guide defining an axis parallel to the axis of the elongate portion.

Embodiment 34. A method of using the inserter of any one of embodiments 27-33 with an expandable interbody, the method comprising:
securing the inserter to the interbody by:
advancing the first and/or second pair of extensions so as to be positioned on either side of the interbody; and
rotating the engagement driver by rotating the handle, thereby causing the operable end of the engagement driver to thread into the threaded aperture of the interbody;
using the inserter to position the interbody in a desired position within a patient's spine;
rotating the expansion driver by rotating the handle, thereby causing expansion of the interbody when the operable end of the expansion driver rotates an expansion ring within the interbody that causes two columns within the interbody to translate relative to each other;
when a desired position and expansion have been achieved, rotating the engagement driver by rotating the handle, thereby causing the operable end of the engagement driver to disengage from the threaded aperture of the interbody; and moving the inserter proximally away from the interbody to leave the interbody in the desired position.

Embodiment 35. The method of embodiment 34, further comprising the step of selecting appropriate endplates, based on size and shape, to be secured to one or both ends of the interbody.

Embodiment 36. The method of embodiment 35, wherein securing the one or two endplates comprises selecting a desired orientation for one or both endplates relative to the interbody and securing one or both endplates in that orientation.

Embodiment 37. The method of any one of embodiments 34-36, further comprising engaging a set screw on the interbody to lock the interbody at a desired level of expansion, wherein engaging the set screw comprises inserting a driver through a driver guide to reach the set screw, the driver guide being located near the distal end of the elongate portion of the inserter.

Embodiment 38. The method of any one of embodiments 34-37, wherein advancing the first and/or second pair of extensions so as to be positioned on either side of the interbody causes a passive locking mechanism of the interbody to disengage thereby allowing for the expansion and/or compression of the interbody.

Embodiment 39. The method of embodiment 38, wherein the passive locking mechanism comprises a pair of resilient arms biased toward an expansion ring, and wherein the first pair of extensions disengage the passive locking mechanism by moving the pair of arms away from the expansion ring.

Embodiment 40. The method of embodiment 39, wherein each of the pair of arms comprises at their respective distal ends a first angled surface, and wherein each of the first pair of extensions comprises at their respective distal ends a second angled surface that is configured to engage with and slide along the first angled surface.

Embodiment 41. The method of any one of embodiments 38-40, wherein moving the inserter proximally away from the interbody to leave the interbody in the desired position causes the passive locking mechanism to engage so as to prevent or limit any compression of the interbody.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular approach (e.g., lateral); however, other approaches (e.g., anterior, posterior, transforaminal, etc.) are also contemplated.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety.

In closing, it is to be understood that the embodiments disclosed herein are illustrative of the principles of the present disclosure. Other modifications that may be employed are within the scope of this disclosure. Thus, by way of example, but not of limitation, alternative configurations of the embodiments of the present disclosure may be utilized in accordance with the teachings herein. Accordingly, the present disclosure is not limited to that precisely as shown and described.

The invention claimed is:

1. A vertebral body replacement device dimensioned for implantation between a first and second vertebral bone, comprising:
   an expandable body configured to expand from a first end to a second end along a longitudinal axis, the expandable body having an outer column, an inner column threadedly coupled and translatable relative to the outer column along the longitudinal axis, and an expansion ring;
   wherein the expansion ring is rotatable about the longitudinal axis to translate the outer column relative to the inner column to adjust a body length of the expandable body, the expansion ring comprising a plurality of radially extending teeth for engaging with an arm of the outer column and a plurality of teeth for engaging with an inserter device;
   the outer column comprising the arm for engaging a tooth of the plurality of radially extending teeth of the expansion ring;
   a first end of the inner column comprising a connector for attachment to an endplate, the connector comprising facets, and an endplate comprising a set screw and a plate, the set screw entrapped within the plate between an inner annular ridge and an inner rim, wherein the endplate is connectable to the inner column; and
   wherein the arm of the outer column has a first, locked configuration in which the expansion ring cannot rotate relative to the outer column and a second, unlocked configuration in which the arm is expanded outwardly to disengage the tooth of the plurality of radially extending teeth to allow the expansion ring to rotate relative to the outer column.

2. The vertebral body replacement device of claim 1, wherein the outer column comprises a first arm for engaging a first tooth of the plurality of radially extending teeth of the expansion ring, and wherein the outer column further comprises a second arm for engaging a second tooth of the plurality of radially extending teeth of the expansion ring.

3. The vertebral body replacement device of claim 2, wherein the first arm and second arm are formed integral to the outer column by slots cut out of a wall of the outer column.

4. The vertebral body replacement device of claim 2, wherein the first arm and the second arm each comprise an inwardly facing sloped face.

5. The vertebral body replacement device of claim 2, wherein the first arm and the second arm comprise an inwardly extending projection for engaging a tooth of the plurality of radially extending teeth of the expansion ring.

6. The vertebral body replacement device of claim 2, wherein the expandable body comprises a first endplate at the first end and a second endplate at the second end.

7. The vertebral body replacement device of claim 6, wherein the first and second endplates independently have one of the following shapes: square, circular, rectangular, oval, and kidney-bean shaped.

8. The vertebral body replacement device of claim 6, wherein at least one endplate is modular and connectable to the first or second end.

9. The vertebral body replacement device of claim 8, wherein the at least one endplate is configured to connect the first or second end at two or more angles relative to the vertebral body replacement device.

10. The vertebral body replacement device of claim 6, wherein at least one of the first and second endplates is integral to the inner or outer column, respectively.

11. The vertebral body replacement device of claim 1, wherein the facets are sinusoidal.

12. The vertebral body replacement device of claim 1, wherein the inner annular ridge of the plate forms an aperture with an inner diameter pattern, the aperture to receive the facets of the connector of the outer column, and wherein an inner diameter pattern of the set screw is connectable to the facets of the connector of the outer column.

13. A vertebral body replacement device dimensioned for implantation between a first and second vertebral bone, comprising:
   an expandable body configured to expand from a first end to a second end along a longitudinal axis, the expandable body having an outer column, an inner column threadedly coupled and translatable relative to the outer column along the longitudinal axis, and an expansion ring;
   wherein the expansion ring is rotatable about the longitudinal axis to translate the outer column relative to the inner column to adjust a body length of the expandable body, the expansion ring comprising a plurality of radially extending teeth for engaging with an arm of the outer column and a plurality of teeth for engaging with an inserter device;
   the outer column comprising the arm for engaging a tooth of the plurality of radially extending teeth of the expansion ring;
   a first end of the inner column comprising a connector for attachment to a set screw of an endplate, the connector comprising facets, and an endplate comprising a set screw and a plate, the set screw entrapped within the plate between an inner annular ridge and an inner rim and the set screw having an internal pattern, wherein the endplate is connectable to the inner column; and
   wherein the arm of the outer column has a first, locked configuration in which the expansion ring cannot rotate relative to the outer column and a second, unlocked configuration in which the arm is expanded outwardly to disengage the tooth of the plurality of radially extending teeth to allow the expansion ring to rotate relative to the outer column.

14. The vertebral body replacement device of claim 13, wherein the inner annular ridge of the plate forms an aperture with an inner pattern, the aperture to receive the facets of the connector of the outer column, and wherein an inner pattern of the set screw is configured to engage with the facets of the connector of the outer column.

15. The vertebral body replacement device of claim 13, further comprising a passive locking mechanism, wherein the passive locking mechanism comprises the expansion ring comprising a plurality of radially extending teeth for engaging with an arm of the outer column and a plurality of teeth for engaging with an inserter device;

the outer column comprising the arm for engaging a tooth of the plurality of radially extending teeth of the expansion ring; and wherein the arm of the outer column has a first, locked configuration in which the expansion ring cannot move relative to the outer column and a second, unlocked configuration in which the arm is expanded outwardly to disengage from the plurality of radially extending teeth to allow the expansion ring to rotate relative to the outer column.

16. A vertebral body replacement system comprising:

an expandable body configured to expand from a first end to a second end along a longitudinal axis, the expandable body having an outer column, an inner column threadedly coupled and translatable relative to the outer column along the longitudinal axis, and an expansion ring;

wherein the expansion ring is rotatable about the longitudinal axis to translate the outer column relative to the inner column to adjust a body length of the expandable body;

the outer column comprising a first end and a second end, and wherein the first end comprises a connector for attachment to a set screw of an endplate; and an endplate comprising a set screw and a plate, the set screw entrapped within the plate between an inner annular ridge and an inner rim; and wherein the endplate is connectable to the outer column.

17. The vertebral body replacement system of claim 16, the connector of the outer column further comprising facets, and wherein the inner annular ridge of the plate forms an aperture with an inner diameter, the aperture to receive the facets of the connector of the outer column, and wherein the set screw is configured to engage with the connector of the outer column.

18. The vertebral body replacement system of claim 16, further comprising a passive locking mechanism.

19. The vertebral body replacement system of claim 18, wherein the passive locking mechanism comprises the expansion ring comprising a plurality of radially extending teeth for engaging with an arm of the outer column and a plurality of teeth for engaging with an inserter device;

the outer column comprising the arm for engaging a tooth of the plurality of radially extending teeth of the expansion ring; and wherein the arm of the outer column has a first, locked configuration in which the expansion ring cannot move relative to the outer column and a second, unlocked configuration in which the arm is expanded outwardly to disengage from the plurality of radially extending teeth to allow the expansion ring to rotate relative to the outer column.

\* \* \* \* \*